(12) United States Patent
Korenblit et al.

(10) Patent No.: US 7,706,056 B2
(45) Date of Patent: Apr. 27, 2010

(54) MODULATION OF TERAHERTZ RADIATION

(75) Inventors: Yehiel Korenblit, Netanya (IL); Boris G. Tankhilevich, Walnut Creek, CA (US)

(73) Assignee: Terahertz Technologies LLC, Walnut Creek, CA (US)

( * ) Notice: Subject to any disclaimer, the term of this patent is extended or adjusted under 35 U.S.C. 154(b) by 176 days.

(21) Appl. No.: 11/891,360

(22) Filed: Aug. 9, 2007

(65) Prior Publication Data

US 2008/0298405 A1 Dec. 4, 2008

Related U.S. Application Data

(63) Continuation-in-part of application No. 11/799,937, filed on May 2, 2007, now Pat. No. 7,471,449, which is a continuation-in-part of application No. 11/481,197, filed on Jul. 3, 2006, now Pat. No. 7,430,074.

(51) Int. Cl.
*H01S 5/00* (2006.01)
*H01S 3/10* (2006.01)
*H01S 1/02* (2006.01)
*H01S 3/16* (2006.01)

(52) U.S. Cl. ............... 359/342; 359/344; 372/26; 372/37; 372/43.01; 372/72

(58) Field of Classification Search .......... 359/342, 359/344; 372/26, 37, 43.01, 72
See application file for complete search history.

(56) References Cited

U.S. PATENT DOCUMENTS

| | | | |
|---|---|---|---|
| 3,822,410 A | 7/1974 | Madey | |
| 3,895,324 A * | 7/1975 | Morgenthaler | ........... 333/147 |
| 3,986,194 A | 10/1976 | Masumoto et al. | |
| 4,626,800 A | 12/1986 | Murakami et al. | |
| 4,679,023 A | 7/1987 | Nelson | |
| 4,914,665 A | 4/1990 | Sorin | |
| 6,111,416 A | 8/2000 | Zhang et al. | |
| 6,230,038 B1 | 5/2001 | von Gutfeld et al. | |
| 6,614,827 B1 | 9/2003 | Mooradian | |
| 6,912,148 B2 | 6/2005 | Hannah et al. | |
| 6,943,651 B2 | 9/2005 | Mukaiyama et al. | |
| 6,988,058 B1 | 1/2006 | Sherwin et al. | |
| 2001/0031547 A1 | 10/2001 | Ohno et al. | |
| 2002/0058120 A1 | 5/2002 | Uchida et al. | |
| 2003/0021908 A1 | 1/2003 | Nickel et al. | |
| 2004/0094801 A1 | 5/2004 | Liang et al. | |
| 2005/0242287 A1 | 11/2005 | Hakimi | |
| 2006/0060815 A1 | 3/2006 | Punnoose | |
| 2006/0088324 A1 | 4/2006 | Fujimoto et al. | |
| 2006/0108619 A1 | 5/2006 | Yoshida et al. | |
| 2006/0238191 A1 | 10/2006 | Saito | |

OTHER PUBLICATIONS

U.S. Appl. No. 11/481,197: Office Action—Election/Restrictions dated Jun. 5, 2007.

(Continued)

*Primary Examiner*—Eric Bolda
(74) *Attorney, Agent, or Firm*—Boris G. Tankhilevich

(57) ABSTRACT

A method of modulation terahertz radiation comprising: (A) generating Terahertz radiation by pumping nonequilibrium electrons into a Magnon Gain Medium (MGM), wherein propagation of nonequilibrium electrons in the MGM causes generation of nonequilibrium magnons, and wherein interaction between the nonequilibrium magnons causes generation of the Terahertz radiation; and (B) frequency modulating THz radiation generated in the MGM by applying longitudinal AC magnetic field, or by applying AC electrical field bias.

19 Claims, 3 Drawing Sheets

OTHER PUBLICATIONS

U.S. Appl. No. 11/481,197: Office Action dated Aug. 31, 2007.
U.S. Appl. No. 11/481,197: Notice of Allowance and Fee(s) Due dated Feb. 22, 2008.
U.S. Appl. No. 11/496,889: Notice of Allowance and Fee(s) Due dated Jun. 30, 2008.
U.S. Appl. No. 11/701,284: Office Action dated Mar. 6, 2008.
U.S. Appl. No. 11/701,284: Notice of Allowance and Fee(s) Due dated Oct. 6, 2008.
U.S. Appl. No. 11/799,937: Notice of Allowance and Fee(s) Due dated Oct. 9, 2008.
M. J. Lisowski, "Electron and Magnetisation Dynamics in Metals Studied by Time-Resolved Photoemission", Dissertation Abstract, Freie Universitat Berlin, Jan. 2006, Berlin Germany.
I. E. Radu, "Ultrafast Electron, Lattice and Spin Dynamics on Rare-Earth Metal Surfaces", Thesis, Freie Universitat Berlin, Mar. 2006, Berlin Germany.
R. Srivastava, "Optically Detected Terahertz Resonance Spectroscopy of Semiconductor Nanostructures", Thesis, Rice University, Apr. 2005, Houston Texas.
M. Belhadi; A. Khater, "Spin Wave Modes And Magnon Scattering At Surface Nanostructure On 2D Heisenberg Ferromagnets", Surface Review and Letters, 2004, p. 99-109, vol. 11, No.
M. Tsoi; A. G. M Jansen; J. Bass; W.-C. Chiang; V. Tsoi; P. Wyder, "Generation and Detection Of Phase-Coherent Current-Driven Magnons In Magnetic Multilayers", Letters to Nature, Nature, Jul. 6, 2000, p. 46-48, vol. 406, Macmillan Magazines Ltd.
J.D. Bierlein and P.M. Richards, "Harmonic Generation and Parametrically Coupled Spin Waves in Yttrium Iron Garnet", Physical Review B, Jun. 1, 1970, pp. 4342-4357, vol. 1, No. 11.
M. I. Kaganov and V. M. Tsukernik, "NonResonance Absorption of Oscillating Magnetic Field Energy by a Ferromagnetic Dielectric", Soviet Physics JETP, Mar. 1960, pp. 587-592, vol. 37 (10), No. 3.
J.P. Lascaray, J.P. Desfours and M. Averous, "Bound Magnetic Polaron Evidence in EuO", Solid State Communications, 1976, pp. 677-679, vol. 19, Pergamon Press.
I. Ya. Korenblit and B. G. Tankhilevich, "Generation of High-Frequency Magnons In A Ferromagnetic Semiconductor", Pis'ma Zh. Eksp. Teor. Fiz. 24, No. 11, pp. 598-601 (Dec. 5, 1976).
I. Ya. Korenblit and B. G. Tankhilevich, "Generation Of High-Frequency Magnons by NonEquilibrium Electrons Polarized Opposite To The Direction Of Magnetization", Soviet Physics JETP, Dec. 1977, pp. 1167-1175, vol. 46, No. 6.
I. Ya. Korenblit, A. A. Samokhvalov and V. V. Osipov, "Heating and Generation Of Magnons By NonEquilibrium Electrons In Ferromagnetic Semiconductors", Soc. Sci. Re. A. Phys., 1987, pp. 447-517, vol. 8, Harwood Academic Publisher GmbH.
L. Passell, O. W. Dietrich and J. Als-Nielsen, "Neutron Scattering From The Heisenberg Ferromagnets EuO and EuS. I. The Exchange Interactions", Physical Review B, Dec. 1, 1976, pp. 4897-4907, vol. 14, No. 11.
J. Schoenes and P. Wachter, "Exchange Optics In Gd-doped EuO", Physical Review B, Apr. 1, 1974, pp. 3097-3105, vol. 9, No. 7.

* cited by examiner

MODULATION OF TERAHERTZ RADIATION

This is a continuation-in-part of the U.S. patent application Ser. No. 11/799,937, filed on May 2, 2007 now U.S. Pat. No. 7,471,449 and entitled "DYNAMICS OF TERAHERTZ RADIATION", which is a continuation-in-part of the U.S. patent application Ser. No. 11/481,197, filed on Jul. 3, 2006 now U.S. Pat. No. 7,430,074 and entitled "GENERATION OF TERAHERTZ WAVES".

TECHNICAL FIELD

The current invention relates to modulation of Terahertz waves.

BACKGROUND ART

The patent application entitled "GENERATION OF TERAHERTZ WAVES" is herein referred to as the patent application #1. The patent application entitled "DYNAMICS OF TERAHERTZ RADIATION" is herein referred to as the patent application #2.

In the patent application #1 a method of THz photon generation was disclosed. The method of patent application #1 comprises: (A) providing a Magnon Gain Medium (MGM), wherein the MGM supports generation of nonequilibrium magnons; and (B) injecting nonequilibrium electrons into the MGM. Propagation of nonequilibrium electrons in the MGM causes generation of nonequilibrium magnons. Interaction between nonequilibrium magnons causes generation of THz photons.

In the patent application #2 apparatus for generation of Terahertz radiation was disclosed. The apparatus of the patent application #2 comprises: (A) a Magnon Gain Medium (MGM), wherein the MGM supports generation of nonequilibrium magnons; and (B) at least one magnon mirror (MM). The nonequilibrium magnons are generated in the MGM. Interaction between nonequilibrium magnons leads to generation of Terahertz photons.

DISCLOSURE OF THE INVENTION

The present invention discloses methods of modulation Terahertz radiation generated due to interaction between nonequilibrium magnons in Magnon Gain Medium (MGM).

One aspect of the present invention is directed to a frequency modulation (FM) of THz photons generated due to interaction between nonequilibrium magnons in MGM.

In one embodiment, the method of the present invention for performing frequency modulation (FM) of THz photons generated in the MGM comprises: (A) generating Terahertz radiation by pumping nonequilibrium electrons into the MGM, wherein propagation of nonequilibrium electrons in the MGM causes generation of nonequilibrium magnons, and wherein interaction between the nonequilibrium magnons causes generation of Terahertz radiation; and (B) modulating the generated in the MGM Terahertz radiation.

In one embodiment of the present invention, the step (A) further comprises: (A1) providing the MGM; and (A2) pumping nonequilibrium electrons into the MGM by using an electron pumping means.

In one embodiment of the present invention, the step (A1) further comprises: (A1, 1) placing the MGM in a thermostat to maintain temperature of the MGM below a critical temperature.

In one embodiment of the present invention, the step (A1) further comprises: (A1, 2) providing the MGM, wherein the MGM includes a conduction (valence band) that splits into two subbands, wherein the first subband is configured to be populated by electrons having spin up, and wherein the orientation of spin up is an orientation directed along direction of magnetization of the MGM, and wherein the second subband is configured to be populated by electrons having spin down, and wherein the orientation of spin down is an orientation directed opposite to the direction of magnetization of the MGM.

In one embodiment of the present invention, the step (A1) further comprises: (A1, 3) providing the MGM, wherein the MGM includes the conduction (valence band) that splits into the two subbands, and wherein the first subband is configured to be populated by electrons having spin up, and wherein the second subband is configured to be populated by electrons having spin down, and wherein the two subbands with the spin up and the spin down are separated by an exchange gap.

In one embodiment of the present invention, the step (A1) further comprises: (A1, 4) providing the MGM, wherein the MGM includes the conduction (valence band) that splits into the two subbands, and wherein the first subband is configured to be populated by electrons having spin up, and wherein the second subband is configured to be populated by electrons having spin down, and wherein the two subbands with the spin up and the spin down are separated by the exchange gap, and wherein if the exchange energy is positive then the bottom of the subband with the spin up is located below a bottom of the subband with the spin down.

In one embodiment of the present invention, the step (A1) further comprises: (A1, 5) providing the MGM, wherein the MGM includes the conduction (valence band) that splits into the two subbands, and wherein the first subband is configured to be populated by electrons having spin up, and wherein the second subband is configured to be populated by electrons having spin down, and wherein two subbands with the spin up and the spin down are separated by the exchange gap, and wherein if the exchange energy is positive then the bottom of the subband with the spin up is located below the bottom of the subband with the spin down, and if the gap $\Delta$ is much greater than the maximum of $\{T_C, E_f\}$, then only the electron states in the lower subband with spin up are occupied in equilibrium, i.e. the electrons are fully polarized. $T_C$ is the Curie temperature of the MGM, and $E_f$ is the Fermi energy of electrons.

In one embodiment of the present invention, the step (B) further comprises: frequency modulating the Terahertz radiation generated in the MGM by placing the MGM into a longitudinal AC magnetic field.

In one embodiment of the present invention, the step (B) further comprises: frequency modulating the Terahertz radiation generated in the MGM by applying AC electric field to the MGM.

Another aspect of the present invention is directed to a frequency modulation (FM) of THz photons generated due to interaction between nonequilibrium magnons in a ferromagnetic material further comprising a MGM, and at least one Magnon Mirror (MM).

In one embodiment, the method of the present invention for performing frequency modulation (FM) of THz photons generated in the ferromagnetic material further comprising the MGM and at least one Magnon Mirror (MM) comprises: (A) generating Terahertz radiation by pumping nonequilibrium electrons into the MGM, wherein propagation of nonequilibrium electrons in the MGM causes generation of nonequilibrium magnons, and wherein the probability of lasing of the generated in the MGM nonequilibrium magnons is increased by employing at least one Magnon Mirror (MM), and wherein interaction between the nonequilibrium magnons in the MGM causes generation of the Terahertz radiation; and (B) modulating generated in the MGM Terahertz radiation.

In one embodiment of the present invention, the step (A) further comprises: (A1) providing the MGM; (A2) providing at least one magnon mirror (MM); and (A3) pumping nonequilibrium electrons into the MGM by using an electron pumping means, wherein the probability of lasing of the generated in the MGM nonequilibrium magnons is increased by employing at least one Magnon Mirror (MM).

In one embodiment of the present invention, the step (A2) further comprises: (A2, 1) providing an internal magnon mirror (Internal MM), wherein the Internal MM comprises a part of the MGM that is located adjacent to a MGM border.

In one embodiment of the present invention, the step (A2) further comprises: (A2, 2) providing an external material placed outside of the MGM, wherein at least one magnon mirror (MM) further comprises an external magnon mirror (External MM), and wherein the External MM comprises a part of the external material adjacent to the MGM border.

In one embodiment of the present invention, the step (A2) further comprises: (A2, 3) providing a non-magnetic spacer, wherein the non-magnetic spacer is placed adjacent to the border of the MGM; and (A2, 4) providing an external magnetic material being placed adjacent to the spacer, wherein the spacer separates the exchange coupling within the MGM from the exchange coupling within the external magnetic material.

In one embodiment of the present invention, the step (A2) further comprises: (A2, 5) providing the magnon mirror (MM) further including a magnon mirror border (MMB) located adjacent to the border of the MGM, wherein the roughness r of the MMB is lesser than the non-equilibrium magnon wave length λ.

In one embodiment of the present invention, the step (A2) further comprises: (A2, 6) providing two magnon mirrors (MM).

In one embodiment of the present invention, the step (A2) further comprises: (A2, 7) providing a circular magnon mirror (CMM).

In one embodiment of the present invention, the step (B) further comprises: frequency modulating the Terahertz radiation generated in the MGM by placing the ferromagnetic material comprising the MGM and at least one Magnon Mirror (MM) into a longitudinal AC magnetic field.

In one embodiment of the present invention, the step (B) further comprises: frequency modulating the Terahertz radiation generated in the MGM by applying AC electric field to the ferromagnetic material comprising the MGM and at least one Magnon Mirror (MM).

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference now will be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific-details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of particles and quasi-particles interactions, procedures, equations, blocks, diagrams, and other symbolic representations of physical processes. These descriptions and representations are the means used by those skilled in the art of physics of condensed matter to most effectively convey the substance of their work to others skilled in the art.

A. Introduction. Magnon Gain Medium (MGM).

In one embodiment of the present invention, a Magnon Gain Medium (MGM) includes a conduction (valence band) that splits into two subbands. The first subband is configured to be populated by electrons having spin up, and the second subband is configured to be populated by electrons having spin down. The orientation of spin up is an orientation directed along direction of magnetization of the MGM. The orientation of spin down is an orientation directed opposite to the direction of magnetization in the MGM. In one embodiment of the present invention, two subbands with spin up and spin down are separated by an exchange gap.

In one embodiment of the present invention, the exchange energy is positive, and the bottom of the subband with the spin up is located below the bottom of the subband with the spin down. In one embodiment of the present invention, the gap Δ is much greater than the maximum of $\{T_C, E_f\}$, wherein $T_C$ is the Curie temperature of MGM, and $E_f$ is the Fermi energy of electrons. In one embodiment of the present invention, only electron states in the lower subband with spin up are occupied in equilibrium, i.e. electrons are fully polarized.

Figure 1:
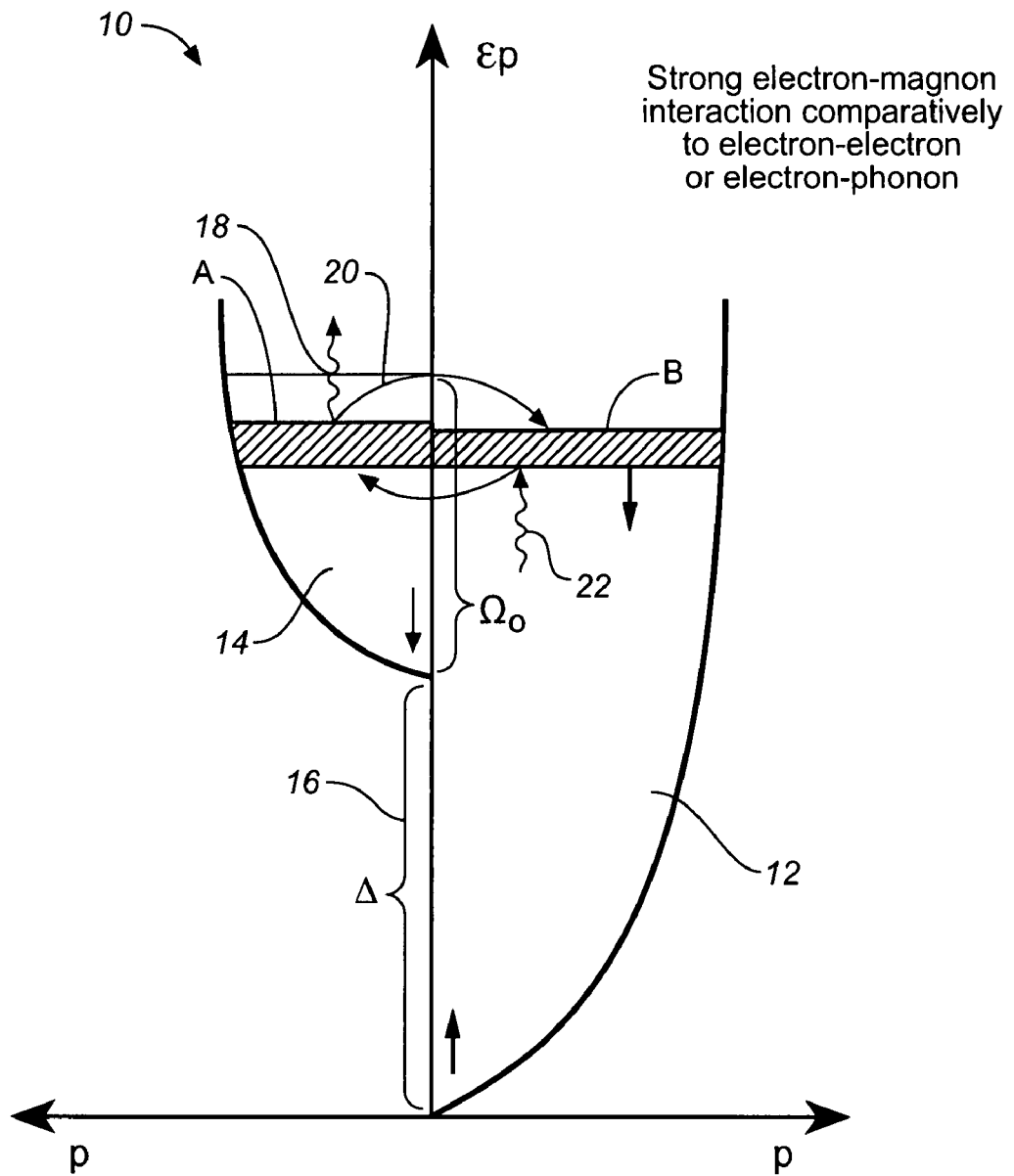
FIG. 1 illustrates MGM further comprising two subbands, wherein a nonequilibrium electron put in the upper subband with spin down rapidly emits a magnon with a large wave vector.

In one embodiment of the present invention, FIG. 1 illustrates a ferromagnetic semiconductor, like EuO, that implements the described above Magnon Gain Medium (MGM), further including two subbands 12 and 14, wherein a nonequilibrium electron put in the upper subband 14 with spin down rapidly emits a magnon 18 with a large wave vector and transitions into the subband 12 with the spin up.

More specifically, the electrons in a ferromagnetic semiconductor can be divided into two groups: free electrons, which determine the electrical conductivity of the semiconductor, and electrons localized at the ions (d- or f-electrons), which determine its magnetic properties.

The main interaction between these two groups of electrons is the exchange interaction, which lifts the spin degeneracy of the electrons. The conduction (valence band) splits into two subbands with spin up (along the magnetization) and spin down, with an exchange gap $\Delta=2I<S_z>$, where I is the exchange energy of the conduction electrons and the localized spins, and $<S_z>$ is the mean value of the localized spins. At temperatures much lower than the Curie temperature, $T_C$, the mean value of the localized spins $<S_z>$ is temperature independent: $<S_z>=S$.

The exchange gap $\Delta$ 16 is usually greater than 0.1 eV. For example, for EuO the exchange gap is: $\Delta=0.6$ eV. For the reference, please see: J. Lascaray, J. P. Desfours, and M. Averous, Sol. St. Com. 19, 677 (1976).

If the exchange energy is positive, I>0, then the bottom of the subband with spin up 12 is located below the bottom of the subband with spin down 14. Usually in ferromagnetic semiconductors the gap $\Delta$ is much greater than the maximum of $\{T_C, E_f\}$. Therefore, only the states in the lower subband 12 are occupied in equilibrium, i.e. the electrons are fully polarized.

A nonequilibrium electron 20 put in the upper subband with spin down rapidly emits a magnon 18, with a large wave vector $q=\hbar^{-1}(2\ m\Delta)^{1/2}$, where m is the electron effective mass.

It follows from the energy and momentum conservation laws that if the energy of this electron, $\in_p$, measured from the bottom of the spin down subband is much lesser than $\Delta$, the wave vector of the emitted magnon, q lies in the interval $q_1 \leq q \leq q_2$, $q_{1,2}=\hbar^{-1}(p_0 \mp p)$, $p_0=(2\ m\ \Delta)^{1/2}$, $p=(2\ m\in_p)^{1/2}<<p_0$. The frequency of these magnons is in the Terahertz region.

For EuO, the values of electron mass m are inconsistent according to different references. According to one reference, (J. Shoenes and P. Wachter, Phys. Rev. B 9, 3097 (1974)), $m=0.35\ m_0$, $m_0$ is the free electron mass, and the wave vector of the excited magnons $q=q_0=\hbar^{-1}\ p_0=2.6\ 10^7\ cm^{-1}$. The spin-wave stiffness $D=10.8\ 10^{-6}$ mev·cm². (L. Passel, O. W. Dietrich and J. Als-Nielsen, Phys. Rev. B 14, 4897, 1976). This gives the energy of the excited magnons $\hbar\omega=Dq^2=0.73$ meV, and the frequency $f_m=\omega/2\pi=0.19$ THz. Interaction between two magnons with frequency f and wave vectors $\vec{q}$ and $(-)\vec{q}$ generates a photon with frequency 2f (for the reference, please see M. I. Kaganov and V. M. Tsukernik, Sov. Phys.—JETP 37, 587 (1960)). Thus, in the above given example, the frequency of the emitted radiation is: $f_r=2f_m=0.38$ THz.

On the other hand, according to another reference (I. Ya. Korenblit, A. A. Samokhvalov and V. V. Osipov, in Sov. Sc. Rev. A, Physics, 8, 447. Harwood Ac. Publ., UK, 1987), the electron mass value in EuO is quite different: $m=1.5\ m_0$. If this is the case, one obtains a quite different value for the radiation frequency: $f_r=1.6$ THz.

More generally, consider a ferromagnetic semiconductor with $\Delta=0.2$ eV, and $m=0.3\ m_0$. Then we have $q_0=1.4\ 10^7\ cm^{-1}$. The magnon frequency $\hbar\omega(q_0)=kT_C(q_0a)^2$, where k is the Boltzmann constant, and a is the lattice constant. With $T_C \approx 100-300$ K and $a=3-5 \times 10^{-8}$ cm, the magnon frequency is $f_m=1.0$ THz, and the radiation frequency $f_r=2.0$ THz.

The ratio of the magnon generation rate, $\Gamma_e(\vec{q})$, to the rate $\Gamma_m(\vec{q})$, their relaxation (in collisions with equilibrium magnons) is a function of the wave vector $\vec{q}$. Therefore the nonequilibrium magnon distribution function, $N(\vec{q})$ has a maximum at some wave vector $\vec{q}=\vec{q}^*$. $N(\vec{q})$ increases with the increase of the electron pumping, and because of the simulated emission of magnons, the function $N(\vec{q})$ grows most rapidly at $\vec{q}$ close to $\vec{q}^*$. When the pumping reaches some critical value, $N(\vec{q}^*)$ starts to increase very fast with the increase of the electron pumping. At some conditions the generation of magnons with $\vec{q}=\vec{q}^*$ becomes avalanche-like, and the magnon system becomes unstable. For more details, please see references: I. Ya. Korenblit and B. G. Tankhilevich, Sov. Phys.—JETP, 46, 1167 (1977); I. Ya. Korenblit and B. G. Tankhilevich, Sov. Phys.—JETP Lett. 24, 555 (1976); I. Ya. Korenblit and B. G. Tankhilevich, Phys. Lett. A 64, 307 (1977), and equations below. As a result, an intense Terahertz radiation can be obtained. Please, see the patent application #1.

B. Introduction. Magnon Mirrors (MM).

The present invention is applicable to any material comprising Magnon Gain Medium (MGM). Nonequilibrium electrons pumped into MGM generate nonequilibrium magnons. After the pumping threshold is reached, the nonequilibrium magnons in MGM will lase. However, the probability of lasing of the generated in the MGM nonequilibrium magnons is increased by employing at least one Magnon Mirror (MM). The interaction between nonequilibrium magnons in MGM causes generation of THz photons. Please, see the patent application #2.

Figure 2:
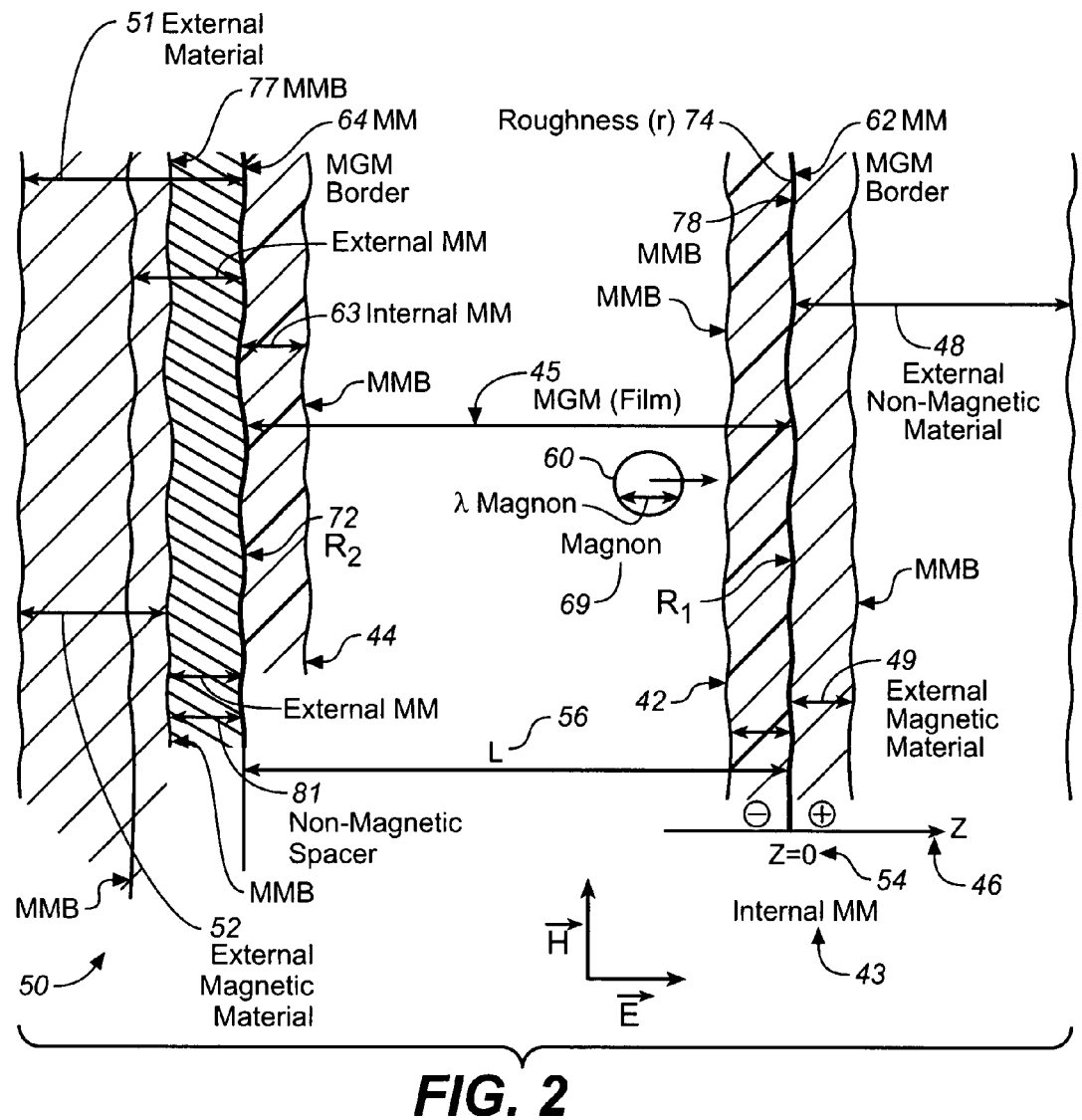
FIG. 2 shows ferromagnetic material comprising a MGM and at least one Magnon Mirror (MM).

One can get a strong anisotropy of the magnon emission by employing two magnon mirrors 62 and 64 separated by the Magnon Gain Medium (MGM) 45, as shown in FIG. 2. The discussion of MM herein is focused on MGM comprising a MGM film 45. Please, see the patent application #2 for more detailed discussion.

The magnon mirrors 62 and 64 also serve as a magnon resonant cavity, and when the electron pumping rate $g_0$ exceeds the electron threshold pumping rate $g_{th}$, only the magnons 61 that move perpendicular to the mirrors meet the amplifying condition which leads to an exponential increase in their numbers with time. (Patent application #2).

In one embodiment of the present invention, it is assumed that z-axis 46 is directed perpendicular to the MGM border 72 which separates MGM film 45 and an external non-magnetic material 48.

In another embodiment of the present invention, the magnon mirror (MM) 64 is adjacent to a non-magnetic spacer 81 that separates MGM film 45 and the external magnetic material 52, wherein MGM film 45 and external magnetic material 52 are having different exchange couplings. It is also assumed that the exchange interaction, j between spins across the MGM border 64 is less than the exchange interaction inside the MGM 45.

Referring still to FIG. 2, consider the MGM film 45 of thickness L 56 which satisfies the inequality L>>$\lambda$, where $\lambda$ 60 is the wave length of spin-wave (SW) (magnon) 61. Based on the estimations given in the patent application #1, depending on the value of the effective electron mass, the spin-wave (SW) wave length 60 is: $\lambda=5\ 10^{-9}$ m-2.5 $10^{-9}$ m.

SW cannot propagate in a non-magnetic media 48. However, SW (magnon) 61 can get reflected from MGM borders 62 and 64. The average roughness 74, r, is defined as an absolute value of the surface height averaged over the surface. In the patent application #2 it is assumed, that the geometrical optics approximation for magnons is valid. Thus, the roughness, r 74, of the border (interface) 62 should be less than the SW length λ 60. Thus, the following inequalities should be satisfied:

r(the roughness 74 of the *MGM* border 62)<<λ(the spin-wave 61(*SW*)wave length 60)<<*L*(the thickness 56 of *MGM* film 45).      Eq. (5)

C. Theory. Frequency Modulation of THz Waves Via Application of AC Magnetic Field.

The present patent application discloses methods of modulation of Terahertz photons generated by nonequilibrium magnons in a ferromagnetic material comprising MGM (or comprising MGM and at least one Magnon Mirror).

Figure 3:
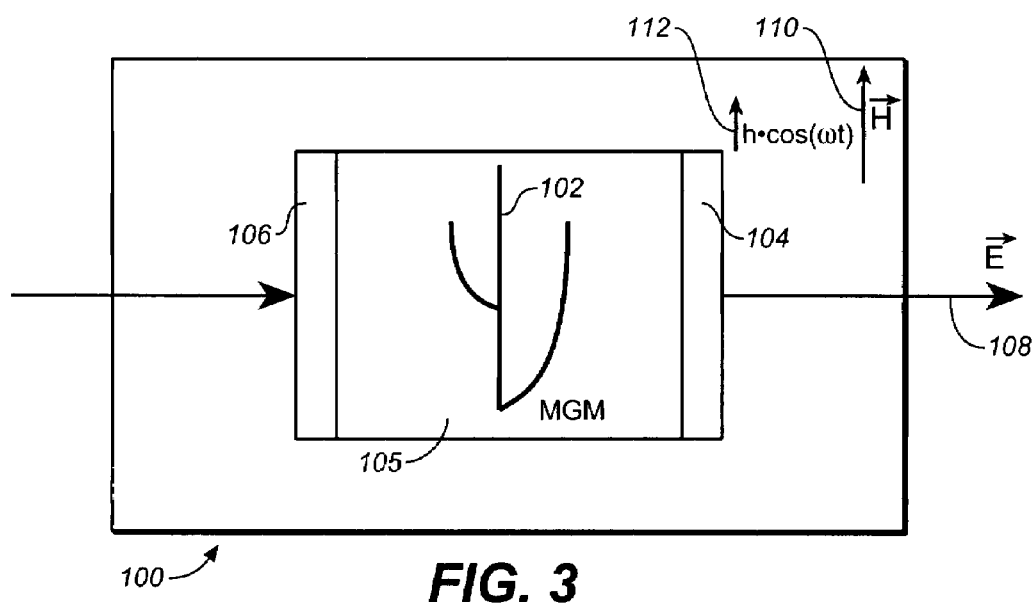
FIG. 3 illustrates frequency modulation of THz waves via AC longitudinal magnetic field applied to the ferromagnetic material comprising the MGM and at least one Magnon Mirror (MM) for the purposes of the present invention.

In one embodiment of the present invention, the modulation of Terahertz waves generated by interaction between nonequilibrium magnons in a ferromagnetic material 105 comprising MGM 102 (or comprising MGM 102 and Magnon Mirrors 104 and 106), is performed by applying longitudinal AC magnetic field $h(t)=h\cos(\omega t)$ 112, as shown in FIG. 3. In this embodiment of the present invention, a DC electric field 108 (an electron pumping means) is configured to inject the nonequilibrium electrons into the MGM 102. Direct current (DC) magnetic filed H 110 is applied to remove the domain structure in the ferromagnetic material 105, and to tune the main frequency of THz radiation, if it is desirable. The MGM 102 is denoted by a special symbol that indicates presence of two subbands with spin up and spin down.

Let us consider how longitudinal AC magnetic field affects the properties of spin waves (SW) spectrum in the ferromagnetic 105.

More specifically, we are interested in SW, with high frequencies, $\omega_q$ satisfying the inequality $\omega_q >> \gamma M$, where $\gamma = g\mu_B/\hbar = 1.76 \times 10^{11}$ Hz/T is the gyromagnetic ratio, and M is the magnetization. The frequency of the generated magnons in EuO is $\omega_q = 5\text{-}10$ THz.

The transverse fluctuations, $m_q = m_x(q) + im_y(q)$, of the magnetic moment in longitudinal AC magnetic field 112:

$$h(t) = h\cos\omega t \quad \text{Eq. (1)}$$

satisfy the equation:

$$\dot{m}_q = i(\omega_q + \gamma \cdot h\cos(\omega \cdot t))m_q \quad \text{Eq. (2)}$$

Here $\omega_q$ is the spin-wave spectrum, $$\omega_q = \gamma H + Dq^2, \quad \text{Eq. (3)}$$

where H is the applied DC magnetic field 110.

The solution of Eq. (2) is as follows:

$$m_q(t) = m_q(0)\exp\left[i\left(\omega_q t + \gamma \int h(t)dt\right)\right] \quad \text{Eq. (4)}$$

$$= m_q(0)\exp\left[i\left(\omega_q t + \gamma \int h\cos\omega t\, dt\right)\right]$$

$$= m_q(0)\exp[i(\omega_q t + (\gamma h/\omega)\sin\omega t)].$$

According to Eq. (4) the transverse fluctuations, $m_q(t)$ of the magnetic moment are frequency modulated (FM) by the applied longitudinal AC magnetic field h(t). (For the reference, please see "Principles of Communication Engineering", by Wozencraft and Jacobs, published by John Wiley & Sons, Inc., 1965, page 645.)

An exact expression for the spectrum of frequency modulated (FM) transverse fluctuations of the magnetic moment can be obtained because h(t) is assumed to be a sinusoid (or cosine according to (Eq. (1)).

More specifically, the Fourier series for $m_q$ is as follows:

$$m_q(t) = m_q(0)\sum_{n=-\infty}^{\infty} J_n\left(\frac{\gamma h}{\omega}\right)\exp[i(\omega_q + n\omega)t], \quad \text{Eq. (5)}$$

where $J_n$ are Bessel functions, and $J_{-n}(x) = (-)J_n(x)$. It is convenient to rewrite this equation as:

$$m_q(t) = m_q(0)\sum_{n=-\infty}^{\infty} J_n\left(\frac{\gamma h}{2\pi f}\right)\exp[i(\omega_q + 2\pi n f)t], \quad \text{Eq. (6)}$$

where $\omega = 2\pi f$. Here $\gamma/2\pi = 2.8 \cdot 10^{10}$ Hz/T.

Thus, with $h = 10^{-3}$ T, and the modulation frequency f=10 MHz, one gets $\gamma h/2\pi f = 2.8$. Since the argument of the Bessel functions is greater than one, many modes contribute to $m_q(t)$ in Eq. (6).

The greater the modulation frequency f, the higher the amplitude of the alternative longitudinal field h 112 that should be applied to ferromagnetic 105 to keep the argument of the Bessel function above 1. For example, for the modulation frequency f=1 GHz, an AC longitudinal magnetic field 112 having an amplitude $h \approx 10^{-1}$ T should be applied to keep the argument of the Bessel function above 1.

The transverse fluctuations, $m_q$ of the magnetic moment in a longitudinal AC magnetic field satisfy the equation Eq. (2) which is a Schrodinger-type equation for frequency modulated quasi-magnons having the spectrum $$\omega_q(t) = \gamma H + Dq^2 + h(t); \quad \text{Eq. (7)}$$

Because of the uniformity of the space, interaction between two such quasi-magnons with wave vectors q and q' should generate a quasi-photon having a wave vector $$\vec{k} = \vec{q} + \vec{q}\,' \quad \text{Eq. (8)}$$

More specifically, it follows from Eq. (5) that each magnon now is a superposition of quasi-magnons which are specified by two quantum numbers, q and n:

$$m_q(t) = m_q(0)\sum_{n=-\infty}^{\infty} J_n\left(\frac{\gamma h}{\omega}\right)\exp[i(\omega_q + n\omega)t] \quad \text{Eq. (9)}$$

$$= m_q(0)\sum_{n=-\infty}^{\infty} J_n\left(\frac{\gamma h}{\omega}\right)\exp[iF(q,n)t]$$

where $$F(q,n) = \omega_q + n\omega \quad \text{Eq. (10)}$$

Therefore, the frequency modulated photon should also be a superposition of quasi-photons, i. e. the photon field should be proportional to:

$$\phi(k,t) = \Sigma A(l)\exp[i\{\nu(k)+l\omega)t\}]; \quad \text{Eq. (11)}$$

Where $$\phi(k,l) = \nu(k) + l\omega. \quad \text{Eq. (12)}$$

Then the energy conservation law should look like:

$$F(q,n) + F(q',n') = \phi(k,l), \quad \text{Eq. (13)}$$

That is two quasi-magnons give birth to one quasi-photon. It follows from the discussion given above, that quasi-photons generated by interaction between two quasi-magnons can be also frequency modulated with the modulation frequency $\omega$ by application of the same longitudinal AC magnetic field 112: $h(t) = h \cos \omega t$.

D. Experimental Setup. Frequency Modulation Via AC Magnetic Field.

J. D. Bierlein and Peter M Richards have investigated second-harmonic generation and ferromagnetic resonance in spheres of yttrium Iron Garnet (YIG) as a function of incident power above the threshold for excitation of z-directed spin waves by the second-order Suhl instability. Phys. Rev B, Vol. 1, 11, June 1970, p. 4342. The analogous microwave circuitry can be used to perform the discussed above FM modulation of THz quasi-photons generated by interaction between two quasi-magnons.

E. Theory. Modulation of THz Waves Via AC Electric Field.

Figure 4:
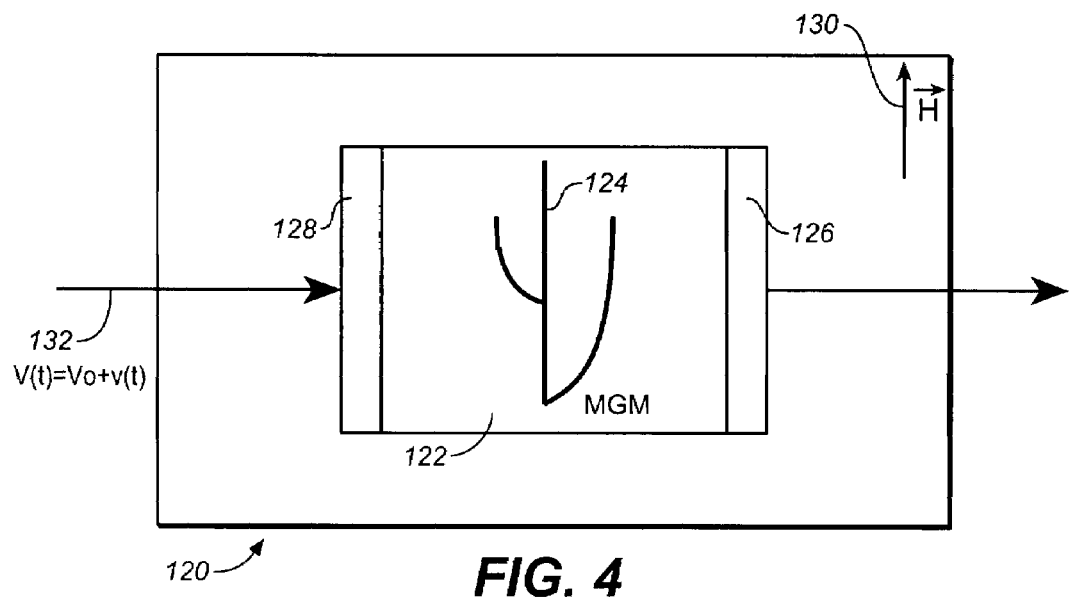
FIG. 4 is an illustration of frequency modulation of THz waves via AC electric field applied to the ferromagnetic material comprising the MGM and at least one Magnon Mirror (MM) for the purposes of the present invention.

In one embodiment of the present invention, FIG. 4 illustrates the frequency modulation of THz waves in the ferromagnetic 122 comprising MGM 124 (or comprising MGM 124 and Magnon Mirrors (MM) 128 and 126) via AC electric field 132. Direct current (DC) magnetic filed H 130 is applied to remove the domain structure in the ferromagnetic material 122, and to tune the main frequency of THz radiation, if it is desirable.

The concentration of electrons in the spin-down subband (14 of FIG. 1) depends on the bias, V. Hence the Fermi energy $E_f$ of these electrons also depends on V: $E_f = E_f(V)$.

Suppose that the bias 132, V, changes with time according to:

$$V(t) = V_0 + v(t), \, v(t) \ll V_0.$$  Eq. (14)

Then the Fermi energy depends on time in the following way:

$$E_f = E_f(V) = E_f(V_0 + v(t)) = E_f^0(1 + B v(t)),$$  Eq. (15)

Where $E_f^0 = E_f(V_0)$ and $B = \partial \ln E_f / \partial V_0$.

It was shown in the patent application #1 that the down-spin electrons emit magnons with wave vectors q in the range $q_1 \leq q \leq q_2$, where $q_{1,2} = \hbar^{-1}(p_0 \mp p)$, $p_0 = (2 m\Delta)^{1/2}$, $p = (2 m E_f)^{1/2} \ll p_0$. Given that the Fermi energy depends on time according to Eq. (15), both $q_1$ and $q_2$ depend on time:

$$q_{1,2}(t) = q_{1,2}(0)\left[1 \mp \frac{p(V_0) B v(t)}{2 p_0}\right],$$  Eq. (16)

$$q_{1,2}(0) = \hbar^{-1}[p_0 \mp p(V_0)], \text{ and } p(V_0) = (2m E_f^0)^{1/2}.$$

As was shown in the patent application #1, that at electron pumping rate exceeding a threshold value, only magnons with q very close to $q_1$ are generated. Thus, under the effect of the AC bias $v(t)$, the frequency of the generated magnons will change with time as follows:

$$\omega_q(t) = \Omega_q - B \omega_{q_0}(p(V_0)/p_0) v(t),$$  Eq. (17)

where $\Omega_q = \omega_{q_0}[1 - 2p(V_0)/p_0]$.

It follows from Eq. (17) that transverse fluctuations of the magnetization $m_q$ are as follows:

$$m_q(t) = m_q(0) \exp[i(\Omega_q t - B\omega_{q_0}(p(V_0)/p_0) v(t) t].$$  Eq. (18)

Consider the time dependent bias:

$$v(t) = v(0) \sin c(\omega t/\pi) = v(0)(\sin(\omega t)/\omega t).$$  Eq. (19)

Then the time dependence of $m_q$ is given by $$m_q(t) = m_q(0) \exp[i(\omega_q t - (b/\omega) \sin \omega t)],$$  Eq. (20)

where $b = B v(0) \omega_{q_0} p(V_0)/p_0$.

Eq. (20) is analogous to Eq. (4) with $\gamma h$ replaced by b. Thus, Eq. (20), like Eq. (4) describes an FM wave. With $E_f/\Delta \approx 10^{-2}$, i. e. $p(V_0)/p_0 \approx 10^{-1}$, and $Bv(0) \approx 10^{-1}$-$10^{-2}$, the argument of the Bessel functions will be equal to 1 if the modulating frequency is of order of $10^{-2}$-$10^{-3}$ of the carrier frequency. Thus, for a carrier frequency 1 THz, the modulating frequency can be as high as 10 GHz. It follows from the discussion given above, that quasi-photons generated by interaction between two quasi-magnons can be also frequency modulated with the same modulation frequency $\omega$ by application of the same AC bias of Eq. (19).

F. Experimental Setup. Frequency Modulation Via Application of AC Electric Field.

For example, in the U.S. Pat. No. 6,943,651, a dielectric resonator device including a dielectric substrate is disclosed. A circular TE010-mode resonator in the center of the dielectric substrate is formed by circular openings formed on the electrode films. In the TE010-mode resonator, its resonant frequency could be set to is set to, for example, 300 GHz (f0=300 GHz), and its diameter could be set to, for example, approximately 3.5 mm, which is a value approximately equal to wavelength of a high frequency signal corresponding to the resonant frequency in the dielectric substrate. Thus, one can use the experimental setup of '651 patent and place the MGM into the TE010-mode resonator having microwave electric field with frequency up to 300 GHz to modulate the generated THz radiation.

G. Application of Modulated THz Radiation.

The modulated THz radiation can be used to transmit much more information in THz spectrum as compared to communication in GHz spectrum. Indeed, if one can modulate THz waves with modulating frequency 20 GHz, the number of telephone conversations that can be carried out by using a single 1 THz carrier is approximately 20 GHz/20 KHz=$10^6$ telephone conversations simultaneously. On the other hand, if a 1 GHz single carrier is used and is modulated by 20 MHz, it can carry only 20 MHz/20 kHz=$10^3$ telephone conversations simultaneously.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical applications to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of modulation terahertz radiation comprising:
   (A) generating Terahertz radiation by pumping nonequilibrium electrons into MGM; wherein propagation of nonequilibrium electrons in said MGM causes into magnon gain medium (MGM); wherein propagation of nonequilibrium electrons in said MGM causes nonequilibrium magnons causes generation of said Terahertz radiation; and (B) modulating said generated in said MGM Terahertz radiation.

2. The method of claim 1, wherein said step (A) further comprises:
(A1) providing said MGM; and
(A2) pumping nonequilibrium electrons into said MGM by using an electron pumping means.

3. The method of claim 2, wherein said step (A1) further comprises:
(A1, 1) placing said MGM in a thermostat to maintain temperature of said MGM below a critical temperature.

4. The method of claim 2, wherein said step (A1) further comprises:
(A1, 2) providing said MGM; wherein said MGM includes a conduction (valence band) that splits into two subbands, and wherein said first subband is configured to be populated by electrons having spin up, and wherein orientation of spin up is an orientation directed along a direction of a magnetization of said MGM; and wherein said second subband is configured to be populated by electrons having spin down, and wherein said orientation of spin down is an orientation directed opposite to said direction of said magnetization of said MGM.

5. The method of claim 2, wherein said step (A1) further comprises:
(A1, 3) providing said MGM; wherein said MGM includes said conduction (valence band) that splits into said two subbands, and wherein said first subband is configured to be populated by electrons having spin up; and wherein said second subband is configured to be populated by electrons having spin down; and wherein said two subbands with said spin up and said spin down are separated by an exchange gap.

6. The method of claim 2, wherein said step (A1) further comprises:
(A1, 4) providing said MGM; wherein said MGM includes said conduction (valence band) that splits into said two subbands, and wherein said first subband is configured to be populated by electrons having spin up; and wherein said second subband is configured to be populated by electrons having spin down; and wherein said two subbands with said spin up and said spin down are separated by said exchange gap; and wherein if the exchange energy is positive then the bottom of said subband with said spin up is located below a bottom of said subband with said spin down.

7. The method of claim 2, wherein said step (A1) further comprises:
(A1, 5) providing said MGM; wherein said MGM includes said conduction (valence band) that splits into said two subbands, and wherein said first subband is configured to be populated by electrons having spin up; and wherein said second subband is configured to be populated by electrons having spin down; and wherein said two subbands with said spin up and said spin down are separated by said exchange gap; and wherein if said exchange energy is positive then said bottom of said subband with said spin up is located below said bottom of said subband with said spin down; and if said gap $\Delta$ is much greater than the maximum of $\{T_C, E_f\}$, wherein $T_C$ is the Curie temperature of said MGM, and wherein $E_f$ is the Fermi energy of electrons, then only electron states in said lower subband with spin up are occupied in equilibrium, i.e. said electrons are fully polarized.

8. The method of claim 2, wherein said step (A1) further comprises:
(A1, 6) providing said MGM; wherein said MGM includes said conduction (valence band) that splits into said two subbands, and wherein said first subband is configured to be populated by electrons having spin up; and wherein said second subband is configured to be populated by electrons having spin down; and wherein said two subbands with said spin up and said spin down are separated by said exchange gap; and wherein if said exchange energy is negative then said bottom of said subband with said spin up is located above said bottom of said subband with said spin down.

9. The method of claim 1, wherein said step (B) further comprises:
(B1) modulating said Terahertz radiation generated in said MGM by placing said MGM into a AC magnetic field.

10. The method of claim 1, wherein said step (B) further comprises:
(B2) frequency modulating said Terahertz radiation generated in said MGM by placing said MGM into a AC magnetic field.

11. The method of claim 1, wherein said step (B) further comprises:
(B3) modulating said Terahertz radiation generated in said MGM by applying AC electric field to said MGM.

12. The method of claim 1, wherein said step (B) further comprises:
(B4) frequency modulating said Terahertz radiation generated in said MGM by applying AC electric field to said MGM.

13. The claim of 9, wherein said step (B1) further comprises:
(B1, 1) applying a direct current (DC) magnetic field to tune the main frequency of said Terahertz radiation generated in said MGM.

14. The claim of 9, wherein said step (B1) further comprises:
(B1, 2) modulating fluctuations of a magnetic moment of said MGM by applying said AC magnetic field.

15. The claim of 11, wherein said step (B3) further comprises:
(B3, 1) applying a direct current (DC) magnetic field to tune the main frequency of said Terahertz radiation generated in said MGM.

16. The claim of 11, wherein said step (B3) further comprises:
(B3, 2) applying AC electric field to said MGM to modulate the concentration of electrons in said spin-down subband.

17. The claim of 11, wherein said step (B3) further comprises:
(B3, 3) applying AC electric field to said MGM to modulate the Fermi energy of said MGM.

18. The claim of 1 further comprising:
(C) using said modulated THz radiation to transmit information in THz spectrum of frequencies.

19. The claim of 18, wherein said step (C) further comprises:
(C1) using said modulated THz radiation with modulating frequency up to 100 GHz to transmit information in THz spectrum of frequencies.

* * * * *